United States Patent
Konoki et al.

[15] 3,640,052
[45] Feb. 8, 1972

[54] PROCESS FOR REMOVING CARBON DIOXIDE IN A COMBINED SYSTEM FOR PRODUCING AMMONIA AND UREA

[72] Inventors: Keizo Konoki, Yachiyo; Kozo Ohsaki, Oguramachi, both of Japan

[73] Assignees: Toyo Engineering Corporation; Mitsui Toatsu Chemicals, Inc., Chiyoda-ku, Tokyo, Japan

[22] Filed: Mar. 11, 1970

[21] Appl. No.: 18,607

[30] Foreign Application Priority Data

Mar. 15, 1969 Japan..................................44/19259

[52] U.S. Cl. .....................................55/19, 23/2 R, 23/150, 55/48, 55/68, 55/160, 55/224
[51] Int. Cl.............................................................B01d 53/14
[58] Field of Search .....................23/2, 150, 193; 55/68, 70, 55/274, 228; 260/553–555

[56] References Cited

UNITED STATES PATENTS 2,912,301 11/1959 Schreiner et al......................23/150 X

FOREIGN PATENTS OR APPLICATIONS 1,108,409 4/1968 Great Britain.......................260/555 X

*Primary Examiner*—Samih N. Zaharna
*Assistant Examiner*—R. W. Burks
*Attorney*—Woodhams, Blanchard and Flynn

[57] ABSTRACT

A process and apparatus for removing excess carbon dioxide from a crude ammonia synthesis gas to be used for producing ammonia and urea, in which the incoming crude ammonia synthesis gas is separated into two streams. One stream is flowed into a scrubbing zone wherein it is contacted with a scrubbing solution so that the partial pressure of the carbon dioxide in the one stream leaving the scrubbing zone is in the range of about 0.02–1.5 atmospheres, under a total pressure of above about 10 atmospheres, at a temperature of about 85°–130° C. The other stream is not scrubbed. The two streams are then combined and are fed to an ammonia and a urea synthesis system. The amount of carbon dioxide removed is changed by adjusting the amounts of gas flowing in the two streams.

7 Claims, 2 Drawing Figures

PROCESS FOR REMOVING CARBON DIOXIDE IN A COMBINED SYSTEM FOR PRODUCING AMMONIA AND UREA

BACKGROUND OF THE INVENTION

1. Field of the Invention

This invention relates to a process for removing excess carbon dioxide from crude ammonia synthesis gas in a combined system for producing ammonia and urea.

2. Description of the Prior Art

A process for the synthesis of ammonia and urea, wherein an ammonia synthesizing system and a urea synthesizing system are combined together, has been disclosed in Japanese Pat. Publication No. 6332/1965 (Pat. No. 461,396) and British Pat. specification No. 1,056,558. This process comprises contacting crude ammonia synthesis gas, mainly composed of hydrogen and containing a large quantity of carbon dioxide, with liquid ammonia or the like in order to remove the carbon dioxide by forming ammonium carbamate, synthesizing ammonia from the thus purified ammonia synthesis gas and simultaneously converting the ammonium carbamate into urea.

According to this process, the stage of scrubbing the crude ammonia synthesis gas with an alkaline scrubbing medium and the stage of regenerating the alkaline scrubbing medium, as employed in conventional ammonia production systems, can both be omitted or it is possible to employ a minimum volume of raw materials for synthesizing urea as required to remove excess carbon dioxide by including the stage of removing excess carbon dioxide in the stage of synthesizing urea. Consequently, the manufacturing cost can be remarkably lowered.

In the usual processes for obtaining crude ammonia synthesis gas for the production of ammonia and urea, as is well known, hydrocarbons are reformed with steam and oxygen or with steam and air to form a gaseous mixture mainly composed of hydrogen and carbon monoxide. Thereafter a major part of the carbon monoxide is reacted with steam to convert the same into hydrogen and carbon dioxide, thereby obtaining hydrogen containing carbon dioxide and other gases.

In obtaining crude gas by reforming hydrocarbons in the above described manner, the carbon dioxide content of the crude gas varies largely depending on the kinds of hydrocarbons used.

The amount of carbon dioxide contained in the crude gas obtained from natural gas mainly composed of methane is almost equivalent to the entire amount of ammonia obtained from the hydrogen contained in the crude gas for synthesizing urea.

However, the carbon dioxide content in a crude gas is obtained from a composition mainly composed of hydrocarbons having more carbon atoms than is contained in a molecule of methane is quite high. Accordingly, the ratio of the carbon dioxide content to the amount of ammonia synthesized from the whole amount of the purified gas from which carbon dioxide etc., have been removed becomes high, and the excess carbon dioxide occurs in the crude gas for the urea synthesis.

Also, when there is utilized a crude gas obtained from a composition mainly composed of methane, if only a part of the ammonia synthesized is used for the urea synthesis, excess carbon dioxide occurs of course in the crude gas for the urea synthesis.

On the other hand, in carrying out a process, such as that described in the above Japanese Pat. No. 461,396, on an industrial scale, it is necessary to remove in advance only the excess carbon dioxide in the crude gas for the urea synthesis, since substantially the entire amount of the carbon dioxide introduced into the urea synthesizing system is converted to urea.

According to market requirements for ammonia and urea, the amounts of ammonia and urea synthesized must be frequently changed.

In addition, the carbon number of the hydrocarbon in the feed is sometimes changed frequently as time passes.

A particular example of this case is observed when an off gas obtained in a petroleum refinery or in the petrochemical industry is utilized as the starting hydrocarbon material.

Therefore, the amount of excess carbon dioxide may vary from time to time depending on the changes in the carbon dioxide content of the feed gas or the changes in the desired amounts of the ammonia and urea to be produced.

It is necessary in a process wherein the excess carbon dioxide is removed in advance, that the amount of carbon dioxide so removed can be capable of adjustment in quick response to a control operation.

This invention is intended to provide a process which is especially excellent in controlling the amount of excess carbon dioxide removed in advance from the crude gas, which process also has a high efficiency in the economy of heat energy.

As is well known, industrially the most widely used procedure for absorbing and thereby removing carbon dioxide from the crude gas involves the use of an aqueous potassium carbonate solution. An absorbing liquor composed of aqueous potassium carbonate and an absorption accelerator, such as arsenious anhydride, an arsenite or an ethanolamine, is generally used.

In the treatment of a crude gas with an absorbing solution of the above type containing potassium carbonate as the main ingredient, it is possible to lower the amount of carbon dioxide residue in the gas to a lower level of approximately 0.5-0.1 percent in one scrubbing stage. In addition, advantageously, the quantity of heat required for the regeneration of the absorbing solution may be economized as compared with what is required when an absorbing solution of an aqueous ethanolamine solution or an aqueous ammonia solution is used.

Thus, it is possible efficiently to utilize these aqueous potassium carbonate solutions also in the removing of excess carbon dioxide in the crude gas.

BRIEF DESCRIPTION OF THE DRAWINGS

In FIG. 1, the solid-line curves represent the relationship between the allowable partial pressure of carbon dioxide in the gas leaving the scrubbing zone and the quantity of heat required for regenerating the absorbing solution when the scrubbing stage and the regenerating stage are operated isothermally, in a system wherein the carbon dioxide in the crude gas is absorbed with an absorbing solution containing potassium carbonate as the main ingredient and then the absorbing solution is contacted with steam to strip the absorbed carbon dioxide thereby performing a regeneration of the scrubbing solution. The dotted-line curves in FIG. 1 show the relationship between the allowable partial pressure of carbon dioxide in the gas leaving the scrubbing zone and the amount of carbon dioxide stripped per 1,000 Kcal. of heat for regenerating the scrubbing solution, in cases, respectively, wherein 6 weight percent of diethanolamine is incorporated as an absorption accelerator and wherein no absorption accelerator is incorporated.

Figure 1:
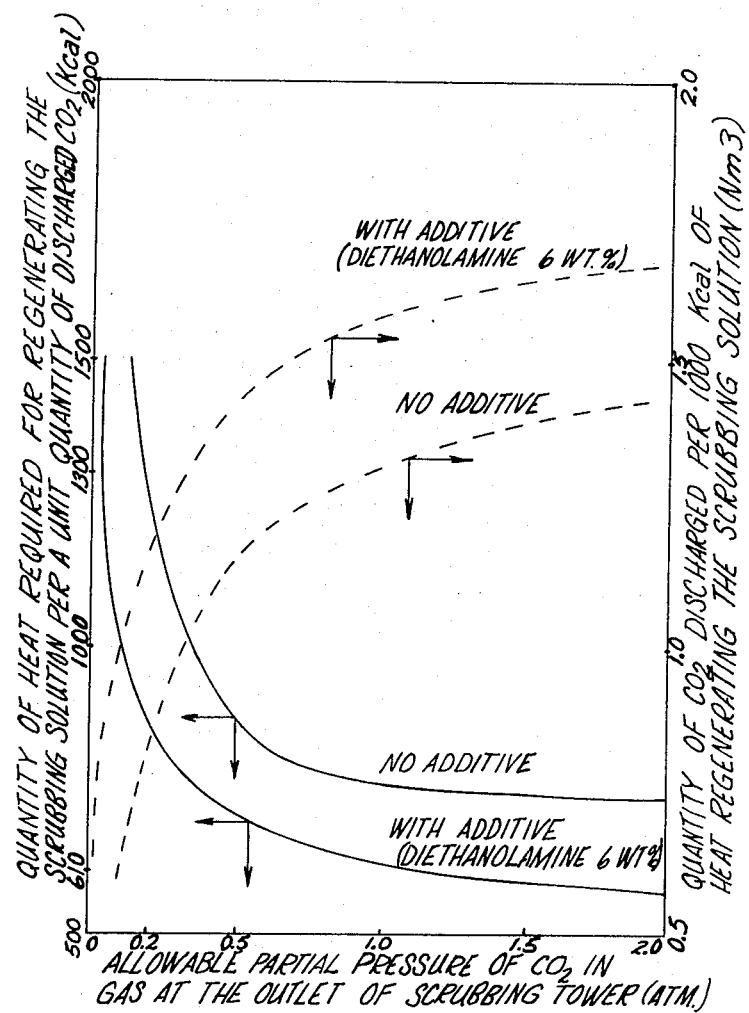
FIG. 1 shows, as applied to a system for scrubbing a gas containing carbon dioxide with a concentrated aqueous solution of potassium carbonate at a high temperature, the relationship between the partial pressure of the carbon dioxide remaining in the gas and the quantity of heat required for regenerating said aqueous solution after the scrubbing.

From an examination of the curves of FIG. 1, it is noted that as the partial pressure of the carbon dioxide leaving the scrubbing zone increases, e.g., above 0.02 atmospheres, the quantity of heat required for the regeneration per one unit of carbon dioxide is reduced sharply, that the rate of reduction of the quantity of heat of regeneration required per one unit of stripped carbon dioxide diminishes as the allowable partial pressure of the carbon dioxide increases and that after the allowable partial pressure of the carbon dioxide becomes more than about 1.5 atmospheres, the quantity of heat of regeneration required per one unit of stripped carbon dioxide is not further substantially reduced so that the quantity of heat required for the regeneration becomes almost constant.

In other words, the amount of carbon dioxide stripped per one unit of heat required for regenerating the scrubbing solution increases in response to an increase in the allowable partial pressure of carbon dioxide leaving the scrubbing zone, and when the allowable partial pressure of carbon dioxide is above 1.5 atmospheres, the amount of carbon dioxide stripped per one unit of heat for regenerating the scrubbing solution becomes almost constant.

In the removal of excess carbon dioxide in a combined system for producing ammonia and urea according to this invention, it is possible to select a very high allowable partial pressure of carbon dioxide in the crude gas leaving the scrubbing zone, and accordingly, the quantity of heat required for regenerating scrubbing solution may be remarkably lowered.

However, when the partial pressure of the carbon dioxide in the crude gas leaving the scrubbing zone is maintained at a high level of, e.g., approximately 2.0 atmospheres, and thereby the quantity of heat required for regenerating the scrubbing solution is made small, the following drawbacks are observed in accurately removing only excess carbon dioxide when there occurs changes of the amount thereof caused by changes in the carbon dioxide content in the crude gas fed into the scrubbing tower or by an alteration of the amount of carbon dioxide removed.

If the degree of regeneration of the scrubbing solution is reduced so that the partial pressure of the carbon dioxide in gas leaving scrubbing zone may be at a high level of above, e.g., 1.5 atmospheres, the quantity of heat required for regeneration per one unit of carbon dioxide will approach the minimum value. Namely, the amount of carbon dioxide stripped per one unit of heat required for regenerating the scrubbing solution is situated at nearly the maximum value and, therefore, is almost constant. Consequently, if the amount of carbon dioxide to be removed is further increased, it is impossible to remove a substantial additional part of the carbon dioxide unless the amount of heat used for regenerating the scrubbing solution is increased to increase the regeneration of the scrubbing solution.

In addition, if the total amount of heat used for regenerating the scrubbing solution is increased for the purpose of increasing the amount of carbon dioxide removed, a quick response to such an increased heat supply does not occur and, therefore, the control of the regeneration of the scrubbing solution is largely delayed in time because the amount of the scrubbing solution in the scrubbing zone and also in the regeneration zone is quite large. Therefore, a close and rapid control of the amount of carbon dioxide removed by increasing or decreasing the heat of regeneration, in order to substantially change the amount of carbon dioxide removed, is substantially impossible.

According to the process of this invention, the above drawbacks are overcome. In addition, the process is economically satisfactory as regards thermal consumption and is adjustable sharply and accurately in response to changes in the amount of carbon dioxide to be removed.

SUMMARY OF THE INVENTION

The process of the invention comprises separating and introducing a portion of a crude ammonia synthesis gas (containing carbon dioxide in excess of the amount to be used for the urea synthesis) into a scrubbing zone, contacting the same with scrubbing solution which has been regenerated so that the partial pressure of the carbon dioxide in the crude gas leaving the scrubbing zone may be in the range of 0.02–1.5 atmospheres under a pressure of above 10 atmospheres, at a temperature in the range of 85°–130° C., in order to remove the excess carbon dioxide. The remainder of the crude ammonia synthesis gas bypasses the scrubbing zone. The amount of excess carbon dioxide removed is controlled by adjusting the ratio of the amount of the crude gas introduced in the scrubbing zone to the remainder of the crude gas not passing the scrubbing zone due to the bypass and, if desired, also by adjusting the amount of the scrubbing solution supplied to the scrubbing zone. Thereafter, the flow of crude gas leaving the scrubbing zone is combined with the flow of crude gas which did not pass through the scrubbing zone due to the bypass. The thus obtained flow of crude gas is utilized for the production of ammonia and urea.

In the process of this invention, the reasons for insuring that the excess carbon dioxide is removed by contacting the separated crude gas with scrubbing solution regenerated so that the partial pressure of the carbon dioxide in the gas leaving the scrubbing zone may be in the range of 0.02–1.5 atmospheres are as follows. It is uneconomical and unnecessary, for controlling the amount of excess carbon dioxide to be removed, to regenerate the scrubbing solution so that the partial pressure of the carbon dioxide in the gas leaving the scrubbing zone may be below 0.02 atmospheres. On the other hand, if the scrubbing solution is regenerated so that partial pressure of carbon dioxide in the gas leaving the scrubbing zone is above 1.5 atmospheres, the quantity of heat required for the regeneration will be a minimum, but in such a case, when the amount of carbon dioxide to be removed is increased suddenly, there will be no means of doing so other than by increasing the total amount of heat supplied for regeneration of the scrubbing solution. Furthermore, the control of the amount of excess carbon dioxide to be removed by the adjustment of the heat of regeneration is accompanied with a great time delay, and so this means is not acceptably rapid in operation.

In the process of this invention, the control of the ratio of the amount of the crude gas introduced into the scrubbing zone to the remainder of the gas not passing through the scrubbing zone, due to the bypass, is effected by decreasing the residence time of the crude gas between a detecting terminal for determining the amount of carbon dioxide necessary for the production of ammonia and urea to be maintained in the crude gas and an operating terminal for adjusting the ratio between the separate two flows of the crude gas, for the purpose of imparting excellent response to the control system provided by the process of the invention.

The adjustment in the amount of the scrubbing solution supplied is also effective for obtaining the desired rapid response, although this technique is inferior to the above described adjustment of the ratio between the two flows of crude gas, because the amount of the scrubbing solution resident in the scrubbing zone is large.

An embodiment of the process of this invention will be illustrated with reference to FIG. 2.

A crude gas containing hydrogen, carbon monoxide and nitrogen as the main ingredients and which is produced in the gasification stage, is passed into a carbon monoxide conversion stage and is thereby converted into crude gas containing a large amount of carbon dioxide. The crude gas is then introduced through a pipe 1 into a stage for removing excess carbon dioxide. A part of the crude gas is then introduced through a pipe 2 into a scrubbing tower 3 and the remainder of the crude gas is fed through a pipe 5 and a flow control valve 6 into a condenser 7.

The quantity of flow of crude gas introduced into the scrubbing tower 3 is controlled by the flow control valve 6 so that carbon dioxide in excess of that required for the desired urea synthesis may be removed in the scrubbing tower 3.

In the scrubbing tower 3, a part of the carbon dioxide in the crude gas, namely, the amount of carbon dioxide which is unnecessary for the synthesis of urea, is removed by contacting same with a scrubbing solution containing potassium carbonate and, if desired, another component, such as an ethanolamine, supplied through a pipe 20 under a pressure above about 10 atmospheres, at a temperature in the range of 85°–135b L C.

The scrubbing solution supplied through the pipe 20 has previously been regenerated in a regenerating tower 23 so that the partial pressure of the carbon dioxide in the crude gas leaving the scrubbing tower 3 through a pipe 4 might be in the range of 0.02–1.5 atmospheres.

The crude gas leaving the scrubbing tower 3 through the pipe 4 is combined with the crude gas from the pipe 5 and is sent into the condenser 7 and is cooled therein. The major part of the water content in the gas is condensed and the condensed water is separated and removed in a gas-liquid separator 8. The gaseous mixture is then fed into a compressor 10 through a pipe 9.

The flow rate and composition of the crude gas flowing through the pipe 9 are measured by a carbon dioxide detector 9A in a conventional manner to detect the quantity of carbon dioxide therein. If the quantity of flow of carbon dioxide is outside of the desired predetermined range for the urea synthesis step, the opening degree of the flow control valve 6 is changed by a control loop 9B to vary the flow rate of the crude gas introduced in the scrubbing tower 3 whereby the quantity of carbon dioxide removed is changed to bring it to an acceptable level.

The control loop, as above described, may be easily automated by means of a publicly known control method.

The pressure of the crude gas is elevated by the compressor 10 at least to the pressure required for urea synthesis. The crude gas is then introduced through a pipe 11 into a scrubbing tower 12, and is contacted there with an aqueous ammonium carbamate solution supplied through a pipe 50 and liquid ammonia supplied through a pipe 51 to absorb and remove substantially the whole quantity of carbon dioxide in the crude gas.

The crude gas exiting from the top of the scrubbing tower 12 is supplied through a pipe 13 into an ammonia synthesis system (not shown in the FIG.).

From the bottom of the scrubbing tower 12, the aqueous solution of ammonium carbamate is supplied through a pipe 52 into the urea synthesis system (not shown in the FIG.).

The scrubbing solution which has absorbed excess carbon dioxide is discharged from the bottom of the scrubbing tower 3 through a pipe 21 and is reduced in pressure to 1–3 atmospheres by a reducing valve 22 and is then introduced into the regenerating tower 23.

In the regenerating tower 23, the scrubbing solution is contacted with steam generated in the tower by heat supplied from a heating pipe 24, under a pressure of 1–3 atmospheres, to discharge a part, but not the entire quantity, of the carbon dioxide in the scrubbing solution.

The discharge carbon dioxide is fed from the top of the regenerating tower 23 through a pipe 25 into a condenser 26 and is cooled therein. A major part of the steam contained in the gas is condensed and is returned to the top of the regenerating tower 23 through a pipe 28.

Carbon dioxide from which a major part of steam has been separated is expelled outside the system through a pipe 27.

The regenerated scrubbing solution discharged from the bottom of the regenerating tower 23 is sent to a pump 30 through a pipe 29 and the pressure thereof is elevated to the pressure in the scrubbing tower 3, and the solution is then supplied in the scrubbing tower 3 through a flow control valve 31 and the pipe 20.

As described above, the scrubbing solution must be regenerated so that the partial pressure of the carbon dioxide in the crude gas leaving the scrubbing tower 3 is in the range of 0.02–1.5 atmospheres, and the heat of regeneration must be supplied by the heating pipe 24 in such an amount so as to maintain the degree of regeneration.

For example, if an aqueous solution of potassium carbonate containing a small quantity of diethanolamine is used as the scrubbing solution, the heat of regeneration is selected to be in the range of 610–1,300 Kcal./Nm.$^3$—$CO_2$.

In the process of this invention, the scrubbing stage and the regeneration stage are maintained under the above described conditions. Any sharp change in the quantity of carbon dioxide to be removed is responded by controlling the amount of gas flowing through the pipe 5 and, if necessary, by further control of the flow of the scrubbing solution passing through the pipe 20 as shown in FIG. 2.

EXAMPLES

Examples will be given with reference to the stages of FIG. 2.

Natural gas containing methane as the main ingredient was reformed with steam and air and the major part of the carbon monoxide in the resulting gas was reacted with steam to convert it into hydrogen and carbon dioxide. A crude gas having the following composition was obtained (shown in volume percent).

| | | | | | | | |
|---|---|---|---|---|---|---|---|
| $CO_2$ | 17.88, | CO | 0.35, | $H_2$ | 61.36, |
| $N_2$ | 19.96, | $CH_4$ | 0.19, | Ar | 0.25. |

A part of the crude gas was flowed into the scrubbing tower 3 through the pipe 2 and was scrubbed with an aqueous solution containing 30 weight percent of $K_2CO_3$ and 6 weight percent of diethanolamine at a temperature of 110°–115° C., under a pressure of 20 atmospheres. A crude gas containing 0.6 volume percent of carbon dioxide was flowed out of the scrubbing tower 3. Ammonia and urea in amounts of 5 t/day respectively were produced from the crude gas obtained from the pipe 11 with the material balance being as shown in Example 1 in the table given below.

When the composition of the starting natural gas was varied to increase the carbon dioxide in the crude gas to 18.25 volume percent from 17.88 volume percent, the opening of the flow control valve 6 was somewhat reduced and the opening of the flow control valve 31 was somewhat increased to yield smoothly the material balance as shown in Example 2.

Instead of an operation to produce 5 t/day of urea with the material balance as shown in Example 1, if the openings of the flow control valves 6 and 31 were controlled so as to change the quantity of urea to 4.075 t/day, the material balance was smoothly changed to that as shown in Example 3.

In the three examples in the following table, no change was made in the quantity of heat supplied to the regenerating tower 23, the pressure inside the tower was atmospheric pressure and the temperature was made equal to that in the scrubbing tower 3.

The process of this invention is further explained above with reference to the system shown in FIG. 2. It is to be noted that the effects of the process can be obtained also when the scrubbing stage and the regenerating stage are carried out nonisothermally. In addition, the effects of the process can be obtained when the regeneration of the scrubbing solution is effected with an inert gas, such as air, instead of steam as described above and also when the crude gas leaving the scrubbing tower is contacted with an inert gas so that the partial pressure of the carbon dioxide contained therein may be in the above mentioned range to control the quantity of removed carbon dioxide. The process of this invention is applicable to any of those stages.

In the latter case, the quantity of supplied inert gas corresponds to the quantity of heat required for the regeneration. If the quantity of supplied inert gas is shown in the ordinate of FIG. 1, curves having the same inclination as in FIG. 1 are given.

TABLE
Material balance Nm.³/hr. (volume percent)

Figure 2:
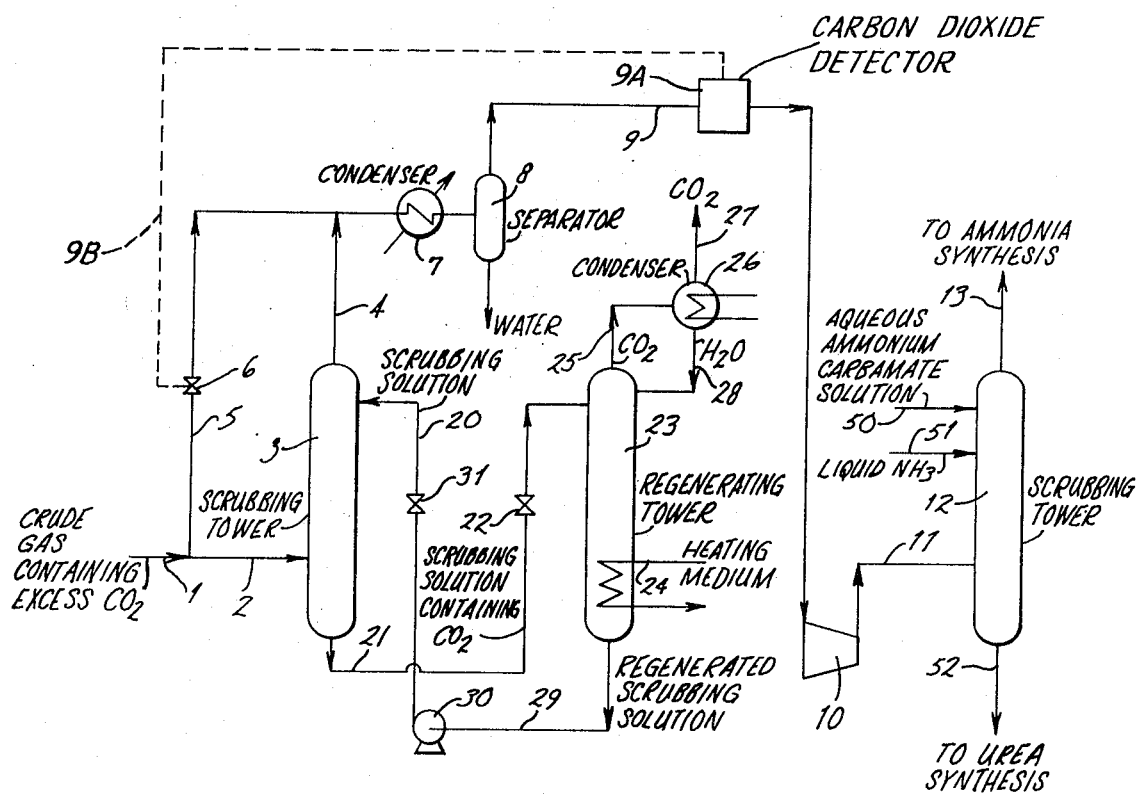
FIG. 2 is a diagrammatic illustration of an embodiment of the process of this invention.

| | Position in Figure 2 | Pipe 1 | Pipe 2 | Pipe 4 | Pipe 5 | Pipe 9 | Pipe 27 | Heat of regeneration, Kcal./hr. (pipe 24) | Quantity of absorbing solution m.³/hr. (pipe 20) |
|---|---|---|---|---|---|---|---|---|---|
| Example 1 | $H_2, N_2, Ar, CH_4, CO$ | 619.4 (82.12) | 265.5 | 265.0 | 353.9 | 619.0 | 0.47 | | |
| | $CO_2$ | 134.9 (17.88) | 57.8 | 1.6 (0.60) | 77.0 | 78.6 (11.28) | 56.22 | 52.7×10³ | 2.115 |
| Total | | 754.3 | 323.3 | 266.6 | 431.0 | 697.6 | 56.69 | | |
| Example 2 | $H_2, N_2, Ar, CH_4, CO$ | 619.4 (81.75) | 277.7 | 277.2 | 341.7 | 618.9 | 0.47 | | |
| | $CO_2$ | 138.2 (18.25) | 62.0 | 2.4 (0.86) | 76.2 | 78.7 (11.28) | 59.59 | 52.7×10³ | 2.115 |
| Total | | 757.7 | 339.7 | 279.6 | 417.9 | 697.6 | 60.06 | | |
| Example 3 | $H_2, N_2, Ar, CH_4, CO$ | 619.4 (82.12) | 358.2 | 357.5 | 261.2 | 618.8 | 0.63 | | |
| | $CO_2$ | 134.9 (17.88) | 78.0 | 7.3 (2.00) | 56.9 | 64.2 (9.40) | 70.71 | 52.7×10³ | 2.825 |
| Total | | 754.3 | 436.2 | 364.8 | 318.1 | 683.0 | 71.34 | | |

The embodiments of the invention in which an exclusive property or privilege is claimed are defined as follows.

1. In a process for producing ammonia and urea, in which a crude gas containing hydrogen, nitrogen and carbon dioxide is treated to remove a part of the carbon dioxide therefrom to obtain a purified synthesis gas and then the purified synthesis gas is treated in a washing zone with ammonia and an aqueous medium to obtain an aqueous absorbate containing the ammonia and carbon dioxide suitable for urea synthesis and a gaseous effluent containing hydrogen and nitrogen suitable for ammonia synthesis, the improvement which comprises separating the incoming crude gas into two streams and adjusting the relative amounts of said crude gas flowing in the two streams in response to the desired carbon dioxide content of the purified synthesis gas;

feeding one of the streams into a scrubbing zone and therein contacting same with a scrubbing solution to remove a part of the carbon dioxide therefrom so that the partial pressure of the carbon dioxide in said one stream leaving said scrubbing zone is at all times maintained in the range of about 0.02 to 1.5 atmospheres, at a temperature in the range of about 85° to 130° C., under a total pressure of at least 10 atmospheres;

regenerating the scrubbing solution in a regenerating zone to remove carbon dioxide therefrom by vaporizing the carbon dioxide and stripping same from said scrubbing solution, with the amount of heat consumed for regenerating the scrubbing solution being substantially constant regardless of the volume of the crude gas flowing in said one stream and the gas scrubbing in said scrubbing zone and the regenerating of the scrubbing solution being carried out substantially isothermally;

recycling regenerated scrubbing solution to the scrubbing zone;

combining said one stream leaving said scrubbing zone with the other stream which has not been scrubbed, whereby an immediate adjustment of the carbon dioxide content of the stream flowing into said washing zone is effected;

and thereafter utilizing said combined streams as the purified synthesis gas having the desired carbon dioxide content.

2. A process according to claim 1, including the step of adjusting the amount of scrubbing solution flowing through said scrubbing zone in order to adjust the amount of carbon dioxide removed.

3. A process according to claim 1, in which the partial pressure of the carbon dioxide in said one stream leaving said scrubbing zone is maintained in the range of 0.2 to 1.5 atmospheres.

4. A process according to claim 1, including the steps of sensing the carbon dioxide content of the purified synthesis gas and adjusting the flow rates in the two streams in response to said sensed value.

5. An apparatus for removing excess carbon dioxide from a crude ammonia synthesis gas to be used for producing ammonia and urea, comprising:
   means for supplying a crude ammonia synthesis gas;
   means for separating said gas into two streams;
   valve means for adjusting the amount of gas flowing in said two streams;
   a scrubbing zone, means for feeding one of said streams into said scrubbing zone and means for supplying a scrubbing solution into said scrubbing zone so that said solution contacts said one stream to remove carbon dioxide therefrom;
   means for combining said one stream leaving said scrubbing zone with said other stream;
   a carbon dioxide detector for measuring the carbon dioxide content of said combined streams and control means for adjusting said valve means in response to the carbon dioxide content of said combined streams; and
   means for feeding said combined streams to an ammonia and urea synthesis system.

6. An apparatus according to claim 5, including valve means for controlling the amount of scrubbing solution flowing into said scrubbing zone.

7. An apparatus according to claim 5, including a second scrubbing zone, means for supplying the combined streams to the second scrubbing zone, means for supplying an aqueous ammonium carbamate solution and liquid ammonia to the second scrubbing zone, means for removing from the second scrubbing zone a gas suitable for ammonia synthesis and an aqueous ammonium carbamate solution suitable for urea synthesis.

* * * * *